United States Patent Office 3,385,846
Patented May 28, 1968

3,385,846
N-CYCLOALKYL-AZABICYCLOOCTANES AND -NONANES AND N-(2-CYCLOALKEN-1-YL)-AZABICYCLOOCTANE AND -NONANE INTERMEDIATES
Milton E. Herr, Kalamazoo Township, Kalamazoo County, and Robert B. Moffett, Kalamazoo, Mich., assignors to The Upjohn Company, Kalamazoo, Mich., a corporation of Delaware
No Drawing. Filed Feb. 28, 1966, Ser. No. 530,323
11 Claims. (Cl. 260—239)

ABSTRACT OF THE DISCLOSURE

New N-cycloalkyl-azabicyclooctanes and -nonanes have been prepared by condensing an azabicyclooctane or -nonane with a cycloalkanone, and reducing the thus-formed enamine. The cycloalkyl group can be methyl substituted. There are four examples describing specific compounds of the invention. The compounds are central nervous system stimulants, and can be used to alleviate mental depression. The compounds form acid addition salts and representative ones are described. Various pharmaceutical forms are suggested.

This invention pertains to novel organic compounds and the process for preparing the same. The invention is more particularly directed to novel N-cycloalkyl-azabicyclooctanes and -nonanes, novel N-(1- or 2-cycloalken-1-yl)-azabicyclooctane and -nonane intermediates, and the novel process which comprises condensing an azabicyclooctane or -nonane with a cycloalkanone by heating in the presence of an inert organic solvent and an acid catalyst, thus preparing an N-(1-cycloalken-1-yl)-azabicyclooctane or -nonane which is reduced, thus preparing the corresponding N-cycloalkylazabicyclooctane or -nonane. The invention includes the novel acid addition salts of the N-cycloalkyl-azabicyclooctanes and -nonanes and of the N-(2-cycloalken-1-yl)-azabicyclooctane and -nonane intermediates.

The novel N-cycloalkyl-azabicyclooctanes and -nonanes of this invention have the structural formula

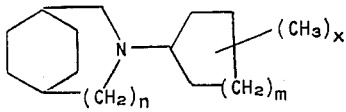
I wherein $n$ is an integer from 0 to 1, inclusive; $m$ is an integer from 1 to 4, inclusive; and $x$ is an integer from 0 to 2, inclusive.

The novel N-(1- or 2-cycloalken-1-yl)-azabicyclooctane and -nonane intermediates of this invention have the structural formulas

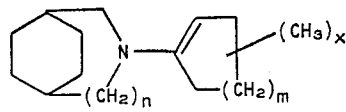
II and

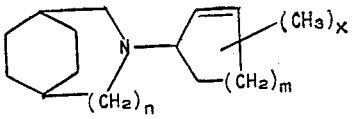
IIA wherein $n$, $m$, and $x$ are as defined above.

The novel N-(1-cycloalken-1-yl)-azabicyclooctanes and -nonanes of this invention (compounds according to Formula II wherein the N-cycloalkenyl group is 1–2 unsaturated) are prepared according to known methods of condensing a cycloalkanone with a secondary amine to obtain the enamine product. [See Stork et al., J. Am. Chem. Soc. 85, pp. 207–222 (1963) and Blanchard, J. Org. Chem. 28, pp. 1397 and 1398 (1963).] The particular secondary amines used in the process of this invention are 2-azabicyclo[2.2.2]octane as prepared by W. Schneider and R. Dillmann, Chem. Ber. 96, 2377 (1963) and 3-azabicyclo[3.2.2]-nonane as described in Belgian Patent No. 608,905 and more recently by V. L. Brown, Jr., and T. E. Stanin, Ind. Eng Chem, Prod. Res. and Dev. 4, pp. 40–47 (1965). 2-azabicyclo[2.2.2]-octane has the formula:

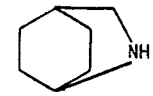
III and 3-azabicyclo[3.2.2]nonane has the formula:

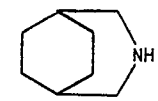
IV

The particular cycloalkanones used in the process of this invention have the structural formula

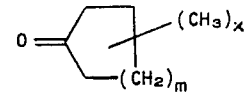
V wherein $m$ and $x$ are as defined above.

According to the stoichiometry of the reaction, one equivalent of an azobicyclooctane or -nonane is required for each equivalent of the cycloalkanone. However, more or less of either reactant can be used. Hence, for example, one equivalent of 3-azabicyclo[3.2.2]nonane can be reacted with 1.5 equivalents of a cycloalkanone, e.g., cyclohexanone. On the other hand, one equivalent of cycloalkanone can be reacted with 1.5 to 2 equivalents of azabicyclooctane or -nonane according to the reactions described by Stork et al., supra.

Condensing a cycloalkanone and an azabicyclooctane or -nonane is effected by heating a mixture of the reactants in an inert organic medium, for example, benzene, toluene, or xylene, at temperatures ranging between about 75° and about 150° C., preferably between about 100° and about 115° C. Advantageously, the reaction mixture should contain a strong acid catalyst which will promote the condensation. Hydrochloric acid can be used, but volatilizes too readily from the reaction mixture. Sulfuric acid can be used also, but sulfonic acids such as p-toluenesulfonic (most preferred), methanesulfonic, and benzenesulfonic acid are preferred.

The reaction mixture is ordinarily heated at the reflux temperature, using a water separator, for from about 5 to about 24 hrs. or until water separation ceases. The N-(1-cycloalken-1-yl)-azabicyclooctane or -nonane product is recovered from the reaction mixture by fractional distillation under reduced pressure. The enamine product tends to be unstable, particularly in the presence of water; and, unless used soon after preparation, it is good practice to store enamines in the cold under nitrogen.

The novel N-(2-cycloalken-1-yl)-azabicyclooctane and -nonane intermediates of this invention (compounds according to Formula IIA wherein the N-cycloalkenyl group is 2–3 unsaturated) are prepared by conventional condensation of 3-halocycloalkene of the formula

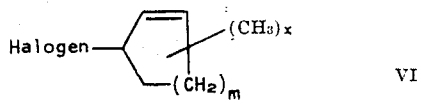

wherein $m$ and $x$ are as defined above, with the azabicyclooctane or -nonane. "Halogen" can be chlorine, bromine, or iodine. Illustrative 3-halocycloalkenes include 3-chlorocyclopentene, 3-bromocyclopentene, 3-iodocyclopentene, 3-bromocyclohexene, 3-chlorocycloheptene, 3-chlorocyclooctene, 3-chloro-5-methylcyclopentene, 3-chloro-4,6-dimethylcyclohexene, and the like.

The above described novel enamines (compounds according to Formula II) and novel N-(2-cycloalken-1-yl)-azabicyclooctanes and -nonanes (compounds according to Formula IIA) are converted into the novel N-cycloalkyl-azabicyclooctanes and -nonanes of this invention (compounds according to Formula I) by reducing the double bond of the N-cycloalken-1-yl group according to conventional methods for reducing carbon to carbon double bonds. Reduction can be accomplished, for example, using hydrogen in the presence of a metal catalyst. Advantageously, the reduction is effected with hydrogen in the presence of a noble metal catalyst, for example platinum, palladium, rhodium and the like; although base metal catalysts can be used, for example, Raney nickel, Raney cobalt, and the like can be used.

In general, satisfactory hydrogenations are accomplished using the following conditions: (1) hydrogen gas under about 15 lbs. to about 50 to 60 lbs. pressure, (2) the catalyst (preferably platinum oxide), (3) temperatures in the range of about 10° C. to about 100° C. (preferably about 25° C.), and (4) a solvent. Representative solvents include ethanol, methanol, isopropyl alcohol, glacial acetic acid, ethyl acetate, diethyl ether, dioxane, and the like. In general, the hydrogenation proceeds readily and is essentially completed in about 15 mins. to about 2 hrs. when, for example, platinum oxide catalyst, hydrogen pressures of about 45 to 60 lbs., and a temperature of about 25° C. are employed.

The N-cycloalkyl-azabicyclooctane or -nonane product is recovered from the hydrogenation reaction mixture by conventional methods, e.g., filtration to remove the catalyst, and removal of solvent by evaporation or distillation. The product can be isolated in pure form by crystallization from a suitable solvent, e.g., ether; by partition between two immiscible solvents; by chromatography; or by a combination of these purification techniques.

The novel N-cycloalkyl-azabicyclooctanes and -nonanes according to this invention (Formula I) can also be prepared by reductive amination of a cycloalkanone (Formula V) according to the Leuckart reaction. The reductive amination is accomplished in general by slowly adding the amine (3-azabicyclo[3.2.2]nonane or 2-azabicyclo[2.2.2]octane) to a quantity of 98+% formic acid in a round bottom flask while cooling the flask and contents in flowing tap water. While the mixture of formic acid and amine is still warm, the cycloalkanone is added. The reaction mixture is then heated at the reflux temperature, while advantageously controlling the generation of carbon dioxide gas with, for example, glass beads. After the reaction is completed and the reaction mixture has been cooled, any unreacted cycloalkanone is removed by diluting the reaction mixture with water, acidifying the aqueous mixture with hydrochloric acid, and extraction with several volumes of ether. After removing any dissolved ether from the ether-extracted, aqueous acid solution by boiling, the solution is heated at the reflux temperature for from 1 to 4 hrs. In order to hydrolyze any formates present. The desired N-cycloalkyl-azabicyclooctane or -nonane product might sometimes separate as the hydrochloride salt on cooling; otherwise the cooled, refluxed, aqueous solution is made basic with about 50% alkali metal hydroxide, e.g., sodium hydroxide and the free base N-cycloalkyl-azabicyclooctane or -nonane extracted with, e.g., diethyl ether. The compound is recovered and purified by conventional methods of washing the ether solution, drying, removing the ether by evaporation, and recrystallizing the compound from a solvent, e.g., acetone.

The novel free base N-cycloalkyl-azabicyclooctanes and -nonanes (Formula I) and the N-(2-cycloalken-1-yl)-azabicyclooctanes and -nonanes (Formula IIA) of this invention form acid addition salts with acids. The novel acid addition salts of the invention are prepared by neutralizing the free base compounds with an acid according to conventional methods. For example, the compounds can be treated with at least a stoichiometric amount of the appropriate acid; and depending upon the nature of the solvent employed, the desired salt will separate spontaneously or can be precipitated by the addition of a solvent in which the salt is insoluble. Acid addition salts can also be prepared metathetically by reacting an acid addition salt of this invention with an acid which is stronger than the acid comprising the acid moiety of the starting salt. Pharmacologically acceptable acid addition salts can be prepared using acids such as sulfuric, hydrochloric, hydrobromic, nitric, phosphoric, benzoic, p-toluenesulfonic, salicylic, acetic, propionic, pamoic, tartaric, citric, succinic acids, and the like. Similarly, acid addition salts can be prepared with acids such as fluosilicic acid, picric, thiocyanic acid, and the like.

The amine-fluosilicate salts prepared by neutralizing the free base compounds with fluosilicic acid are according to U.S. Patents No. 1,915,334 and No. 2,075,359 useful as mothproofing agents. The thiocyanate salts prepared by neutralizing the free base compounds with thiocyanic acid can be condensed with formaldehyde in accordance with U.S. Patents No. 2,425,320 and No. 2,606,155 to form amine thiocyanate-formaldehyde condensation products for use as pickling inhibitors. All of the acid addition salts of this invention are useful in the purification of the free bases.

The novel N-cycloalkyl-azabicyclooctanes and -nonanes of Formula I and the novel N-(1- or 2-cycloalken-1-yl)-azabicyclooctane and -nonane intermediates of Formulas II and IIA are useful organic chemicals. The latter intermediates are inherently useful in accordance with the invention for preparing the former. The novel N-cycloalkyl-azabicyclooctanes and -nonanes are useful as pharmacologics. The compounds are active as central nervous system stimulants and can be used to make mammals, birds, and other animals more alert and responsive to their environment. They can be used to alleviate mental depression. The novel N-cycloalkyl-azabicyclooctanes and -nonanes of this invention are enzyme inhibitors and inhibit the action of pseudocholin-esterase; they also suppress the desire for food, enhance urinary excretion, antagonize the effects of nicotine, suppress inflammatory reactions, and help control blood sugar levels in insulin deficiency conditions.

The valuable pharmacologic properties of the novel N-cycloalkyl-azabicyclooctanes and -nonanes of this invention are realized by administering the compounds or their pharmacologically acceptable acid addition salts to mammals, birds, and other animals in either oral or parenteral compositions.

For oral administration N-cycloalkyl-azabicyclooctanes and -nonanes and their pharmacologically acceptable acid addition salts can be formulated with a pharmaceutical carrier to give solid or fluid unit dosage forms.

Suitable solid forms include tablets, pills, capsules, granules, powders, suppositories, and the like. Advantageously, the pharmaceutical carrier for such solid forms include corn starch, lactose, dicalcium phosphate, terra alba (calcium sulfate), talc, stearic acid, magnesium stearate, and gums. Suitable fluid forms include solutions, suspensions, syrups, and emulsions. Advantageously, the pharmaceutical carrier for such fluid forms comprise water, oils, and water-oil emulsions. If desired, suitable dispersing or suspending agents can be included, for example, tragacanth, acacia, alginates, dextran, sodium carboxymethylcellulose, methylcellulose, polyvinylpyrrolidone, gelatin, and mixtures thereof. Suitable oils for solutions and water-oil emulsions include cottonseed oil, sesame oil, coconut oil, and peanut oil.

For parenteral administration N-cycloalkyl-azabicyclooctanes and -nonanes and their pharmacologically acceptable acid addition salts can be formulated in dilute aqueous solutions, aqueous suspensions, and oil dispersions for intramuscular injection, intravenous drip, vascular perfusion, or like routes. Advantageously, a solubilizer, for example, N,N-dimethylacetamide (preferred), N,N-dimethylformamide, ethanol, and the like can be utilized. If desired, other aqueous media such as water for injection, normal saline solution, Ringer's solution, blood plasma, and whole blood can be used.

Compositions of N-cycloalkyl-azabicyclooctanes and -nonanes and their pharmacologically acceptable acid addition salts for topical applications include powders (preferred), ointments, creams, pastes, jellies, and the like. Such compositions of the essential active ingredient can include emulsifying agents, solvents, antioxidants, preservatives, buffers, and bodying materials.

The following examples are illustrative of the process and products of the present invention, but are not to be construed as limiting.

EXAMPLE 1

*Preparation of 3-cyclohexyl-3-azabicyclo[3.2.2] nonane and hydrochloride thereof*

To a mixture consisting of 3.77 ml. formic acid and 12.5 g. 3-azabicyclo[3.2.2]nonane obtained by slowly adding the amine to the acid in a round-bottom flask cooled by flowing tap water was added 5.2 ml. cyclohexanone. The reaction mixture was heated at the reflux temperature for about 5 hrs., and then cooled before diluting with water, acidifying with hydrochloric acid, and removing the unreacted ketone and other neutral material by extraction with several volumes of ether. The acidified, ether-extracted, aqueous mixture was boiled in order to remove dissolved ether, and then heated at the reflux temperature for about 3 hrs. The refluxed mixture was made alkaline with 50% aqueous sodium hydroxide. The alkaline mixture was extracted with ether several times, and the combined ether extracts were washed with water. After drying the washed ether extract over anhydrous sodium sulfate, the ether was removed by evaporation and acetone was added. There was thus obtained 3-cyclohexyl-3-azabicyclo[3.2.2]nonane free base as a solid.

*Analysis.*—Calc'd for $C_{14}H_{25}N$: C, 81.09; H, 12.15; N, 6.76. Found: C, 80.82; H, 12.07; N, 7.67.

3-cyclohexyl-3-azabicyclo[3.2.2]nonane hydrochloride was prepared by dissolving the free base in dilute aqueous hydrochloric acid. The hydrochloride was recovered by extracting the aqueous acid solution with methylene chloride; drying the methylene chloride extract over anhydrous sodium sulfate and removing the solvent by evaporation. After washing the residue with ether, there was obtained 3-cyclohexyl-3-azabicyclo[3.2.2]-nonane hydrochloride as white crystals having a melting point greater than 300° C. (with decomposition).

*Analysis.*—Calc'd for $C_{14}H_{26}ClN$: C, 68.96; H, 10.75; Cl, 14.54. Found: C, 68.82; H, 10.54; Cl, 14.72.

3-cyclohexyl-3-azabicyclo[3.2.2]nonane free base, as well as the other novel free base compounds according to Formulae I and II, can be converted to other acid addition salts, illustratively, the hydrobromide, the sulfate, the nitrate, the phosphate, the acetate, the lactate, the benzoate, the salicylate, the glycolate, the succinate, the tartrate, the maleate, the malate, the pamoate, the cyclohexanesulfamate, the citrate, the picrate, and the methanesulfonate, by neutralizing the free base with the appropriate acid as described above.

EXAMPLE 2

*Preparation of 2-cyclohexyl-2-azabicyclo[2.2.2]octane hydrochloride*

PART A.—2-(1-CYCLOHEXEN-1-YL)-2-AZABICYCLO[2.2.2]OCTANE

A mixture consisting of 37.7 g. (0.34 mole) 2-azabicyclo[2.2.2]octane, 44.1 g. (0.45 mole) cyclohexanone, 0.25 g. p-toluenesulfonic acid, and 70 ml. toluene was heated at the reflux temperature for 4 hrs. (A Dean-Stark trap was used to collect the water produced by the reaction, and slightly more than the theoretical amount was collected.) After removing the toluene by distillation, 62.12 g. of 2-(1-cyclohexen-1-yl)-2-azabicyclo[2.2.2] octane as a colorless liquid was recovered by distilling the residue from a Claisen flask at 85° C. and 0.005 mm. mercury pressure.

*Analysis.*—Calc'd for $C_{13}H_{21}N$: N, 7.32. Found: N, 7.25.

PART B.—2-CYCLOHEXYL-2-AZABICYCLO[2.2.2] OCTANE HYDROCHLORIDE

A solution consisting of 59.7 g. (0.31 mole) 2-(1-cyclohexen-1-yl)-2-azabicyclo[2.2.2]octane (Part A, above) and 200 ml. absolute ethanol was hydrogenated at about 25° C. and 60 p.s.i. pressure in the presence of 0.2 g. platinum oxide. The theoretical amount of hydrogen was taken up in 2 hrs. After filtering to remove the catalyst, the ethanol was removed by evaporation and 59.2 g. of nearly colorless 2-cyclohexyl-2-azabicyclo[2.2.2] octane was obtained as an oil. The oil was dissolved in absolute ether and the ether solution was acidified with ethanolic hydrogen chloride. A precipitate formed and there was thus obtained 67.6 g. of 2-cyclohexyl-2-azabicyclo[2.2.2]octane hydrochloride as a white solid melting at 231° to 236° C. (with decomposition). Recrystallization from isopropyl alcohol gave 38.9 g. of white crystals melting at 237° to 239° C. (with decomposition).

*Analysis.*—Calc'd for $C_{13}H_{24}ClN$: C, 67.94; H, 10.53; Cl, 15.43; N, 6.10. Found: C, 67.94; H, 10.52; Cl, 15.37; N, 5.98.

EXAMPLE 3

*Preparation of 3-cyclohexyl-3-azabicyclo[3.2.2]nonane and the hydrochloride thereof*

PART A.—3-(1-CYCLOHEXEN-1-YL)-3-AZABICYCLO[3.2.2]NONANE

A mixture consisting of 62.5 g. (0.5 mole) 3-azabicyclo[3.2.2]nonane, 73.5 g. (0.75 mole) cyclohexanone, 0.42 g. p-toluenesulfonic acid, and 100 ml. toluene was heated at the reflux temperature for 5½ hrs. (A Dean-Stark trap was used to collect the water produced by the reaction, and the theoretical amount was collected. After removing the toluene by distillation, and discarding a small portion of distillate, 77.4 g. of 3-(1-cyclohexen-1-yl)-3-azabicyclo[3.2.2]nonane as a colorless liquid was recovered by distilling the residue from a Claisen flask at 90° C. and 0.025 mm. mercury pressure. The refractive index, $n_D^{25}$, was 1.534. The colorless liquid crystallized and the melting point of the pure crystals was 26.5° C.

*Analysis.*—Calc'd for $C_{14}H_{23}N$: N, 6.82. Found: N, 6.96.

PART B.—3-CYCLOHEXYL-3-AZABICYCLO[3.2.2]NONANE

A solution consisting of 75.5 g. (0.368 mole) 3-(1-cyclohexen-1-yl)-3-azabicyclo[3.2.2]nonane (Part A. above) and 200 ml. methanol was hydrogenated at about 25° C. and 50 p.s.i. pressure in the presence of 0.2 g. platinum oxide. About 91% of the theoretical amount of hydrogen was taken up. Crystals that had formed during the hydrogenation were dissolved by warming the solution before filtering to remove the catalyst. Most of the methanol was removed by evaporation, and there was thus obtained 64.4 g. (85% yield) of crystalline 3-cyclohexyl-3-azabicyclo[3.2.2]nonane having a melting point of 46° to 47° C.

*Analysis.*—Calc'd for $C_{14}H_{25}N$: N, 6.76. Found: N, 6.57.

The hydrochloride was prepared by adding an excess of an ethanolic solution of hydrogen chloride to an ether solution of the base (Part B, above). There was thus obtained 77.8 g. of 3-cyclohexyl-3-azabicyclo[3.2.2]nonane hydrochloride as white crystals melting at 309.5° C. (with decomposition). Recrystallization from 500 ml. isopropyl alcohol wave 66.7 g. (90% yield) of white crystals melting at 313° C. (with decomposition).

*Analysis.*—Calc'd for $C_{14}H_{26}ClN$: Cl, 14.54. Found: Cl, 14.38.

EXAMPLE 4

*Preparation of 3-cyclopentyl-3-azabicyclo[3.2.2] nonane and the hydrochloride thereof*

PART A.—3-(2-CYCLOPENTEN-1-YL)-3-AZABICYCLO [3.2.2]NONANE

To a mixture consisting of 62.5 g. (0.5 mole) 3-azabicyclo[3.2.2]nonane and 200 ml. of benzene was added, slowly with stirring, 56.1 g. (0.55 mole) of 3-chlorocyclopentene. Stirring was continued for 16 hrs. After removing the benzene by evaporation under reduced pressure, there was added 300 ml. aqueous sodium hydroxide prepared by diluting 80 ml. (1 mole) 50% aqueous sodium hydroxide with water, and 85 ml. (0.67 mole) benzensulfonyl chloride. The reaction mixture became hot, and stirring on a steam bath was continued for 15 mins. After cooling, the reaction mixture was extracted with ether, and the ether extract was washed with water. The washed ether extract was then thoroughly mixed with 250 ml. of dilute hydrochloric acid (prepared by diluting 100 ml. concentrated hydrochloric acid with water to a volume of 500 ml.) and the aqueous acid layer was separated. The extraction and separation of the aqueous acid layer was repeated with a second 250 ml. volume of the dilute hydrochloric acid, and the ether phase remaining was washed with water. The combined aqueous acid extracts and wash were made alkaline with sodium hydroxide, and the aqueous alkaline solution was extracted with ether. The ether extract was washed with water, washed with saturated sodium chloride solution, and dried over anhydrous sodium sulfate. The ether was removed by evaporation, and the residual oil was distilled through a short helices column. A small portion of the first distillate was discarded, and there was obtained 57.5 g. (60% yield) of 3-(2-cyclopenten-1-yl)-3-azabicyclo[3.2.2]nonane as a liquid boiling at 81° C. and 0.075 mm. mercury pressure and having a refractive index $n_D^{25}$ 1.5192.

*Analysis.*—Calc'd for $C_{13}H_{21}N$: C, 81.61; H, 11.06; N, 7.32. Found: C, 81.79; H, 10.83; N, 7.30.

The hydrochloride was prepared by dissolving 26.0 g. (0.136 mole) 3-(2-cyclopenten-1-yl)-3-azabicyclo[3.2.2] nonane (prepared as above) in 500 ml. absolute ether and adding ethanolic hydrogen chloride. The solid that formed was collected on a filter, washed with ether, and dried. There was thus obtained 15.26 g. 3-(2-cyclopenten-1-yl-3 - azabicyclo[3.2.2]nonane hydrochloride as white crystals melting at 226° C. (with decomposition). Recrystallization from isopropyl alcohol gave 12.18 g. of the pure compound as white crystals melting at 230° C. (with decomposition).

*Analysis.*—Calc'd for $C_{13}H_{22}ClN$: C, 68.54; H, 9.74; Cl, 15.57; N, 6.15. Found: C, 68.51; H, 9.44; Cl, 15.57; N, 5.83.

PART B.—3-CYCLOPENTYL-3-AZABICYCLO[3.2.2]NONANE AND THE HYDROCHLORIDE THEREOF

A solution consisting of 30.3 g. (0.159 mole) 3-(2-cyclopenten-1-yl) - 3-azabicyclo[3.2.2]nonane (Part A, above) and 150 ml. ethanol was hydrogenated at about 25° C. and 50 p.s.i. pressure in the presence of 0.1 g. platinum oxide. The theoretical amount of hydrogen was taken up within 20 mins. The solution was filtered to remove catalyst, and ethanolic hydrogen chloride was added to the filtrate. After dilution with 600 ml. absolute ether, white crystals formed. The crystals were collected on a filter, and there was thus obtained 25.9 g. of 3-cyclopentyl-3-azabicyclo[3.2.2]nonane hydrochloride melting at 315° C. (with some sintering above 260° C., and ultimately decomposition). Recrystallization from a mixture of 100 ml. isopropyl alcohol and 50 ml. methanol gave 23.4 g. of the compound as white crystals melting at 311° C. (with decomposition).

*Analysis.*—Calc'd for $C_{13}H_{24}ClN$: C, 67.94; H, 10.53; Cl, 15.43; N, 6.10. Found: C, 67.73; H, 10.30; Cl, 15.23; N, 6.08.

3-cyclopentyl-3-azabicyclo[3.2.2]nonane free base can be prepared by mixing the hydrochloride of Example 4, Part B, with aqueous sodium hydroxide solution, extracting the mixture with ether, drying the ether extract and evaporating it to dryness.

EXAMPLE 5

Following the procedure of Example 2, Part A, but substituting cycloheptanone, cyclooctanone, 3-methylcyclopentanone, 3,4-dimethylcyclopentanone, 2,5-dimethylcyclopentanone, 2,4,-dimethylcyclohexanone, 2-methylcyclohexanone, 3 - methylcyclohexanone, 4 - methylcyclohexanone, 2,7 - dimethylcycloheptanone, 3,3 - dimethylcycloheptanone, 2-methylcyclooctanone, and 4,6-dimethylcyclooctanone for cyclohexanone, there can be prepared:

2-(1-cyclohepten-1-yl)-2-azabicyclo[2.2.2.]octane,
2-(1-cycloocten-1-yl)-2-azabicyclo[2.2.2]octane,
2-(3-methyl-1-cyclopenten-1-yl)-2-azabicyclo[2.2.2] octane,
2-(3,4-dimethyl-1-cyclopenten-1-yl)-2-azabicyclo[2.2.2] octane,
2-(2,5-dimethyl-1-cyclopenten-1-yl)-2-azabicyclo[2.2.2] octane,
2-(2,4-dimethyl-1-cyclohexen-1-yl)-2-azabicyclo[2.2.2] octane,
2-(2-methyl-1-cyclohexen-1-yl)-2-azabicyclo[2.2.2] octane,
2-(3-methyl-1-cyclohexen-1-yl)-2-azabicyclo[2.2.2] octane,
2-(4-methyl-1-cyclohexen-1-yl)-2-azabicyclo[2.2.2] octane,
2-(2,7-dimethyl-1-cyclohepten-1-yl)-2-azabicyclo[2.2.2] octane,
2-(3,3-dimethyl-1-cyclohepten-1-yl)-2-azabicyclo[2.2.2] octane,
2-(2-methyl-1-cycloocten-1-yl)-2-azabicyclo[2.2.2] octane, and
2-(4,6-dimethyl-1-cycloocten-1-yl)-2-azabicyclo[2.2.2] octane, respectively.

EXAMPLE 6

Following the procedure of Example 2, Part B, but substituting 2-(1-cyclohepten-1-yl)-2-azabicyclo[2.2.2]octane,
2-(1-cyclohepten-1-yl)-2-azabicyclo[2.2.2]octane,
2-(3-methyl-1-cyclopenten-1-yl)-2-azabicyclo[2.2.2] octane,
2-(3,4-dimethyl-1-cyclopenten-1-yl)-2-azabicyclo[2.2.2] octane,
2-(2,5-dimethyl-1-cyclopenten-1-yl)-2-azabicyclo[2.2.2] octane,
2-(2,4-dimethyl-1-cyclohexen-1-yl)-2-azabicyclo[2.2.2] octane,
2-(2-methyl-1-cyclohexen-1-yl)-2-azabicyclo[2.2.2] octane, 2-(4-methyl-1-cyclohexen-1-yl)-2-azabicyclo[2.2.2]-
octane,
2-(2,7-dimethyl-1-cyclohepten-1-yl)-2-azabicyclo[2.2.2]-
octane,
2-(3,3-dimethyl-1-cyclohepten-1-yl)-2-azabicyclo[2.2.2]-
octane,
2-(2-methyl-1-cycloocten-1-yl)-2-azabicyclo[2.2.2]-
octane, and
2-(4,6-dimethyl-1-cycloocten-1-yl)-2-azabicyclo[2.2.2]-
octane for 2 - (1 - cyclohexen - 1 - yl)-2-azabicyclo[2.2.2]octane
there can be prepared:

2-cycloheptyl-2-azabicyclo[2.2.2]octane hydrochloride,
2-cyclooctyl-2-azabicyclo[2.2.2]octane hydrochloride,
2-(3-methylcyclopentyl)-2-azabicyclo-[2.2.2]octane
hydrochloride,
2-(3,4-dimethylcyclopentyl)-2-azabicyclo[2.2.2]octane
hydrochloride,
2-(2,5-dimethylcyclopentyl)2-azabicyclo[2.2.2]octane
hydrochloride,
2-(2,4-dimethylcyclohexyl)-2-azabicyclo[2.2.2]octane
hydrochloride,
2-(2-methylcyclohexyl)-2-azabicyclo[2.2.2]octane
hydrochloride,
2-(3-methylcyclohexyl)-2-azabicyclo[2.2.2]octane
hydrochloride,
2-(4-methylcyclohexyl)-2-azabicyclo[2.2.2]octane
hydrochloride,
2-(2,7-dimethylcycloheptyl)-2-azabicyclo[2.2.2]octane
hydrochloride,
2-(3,3-dimethylcycloheptyl)-2-azabicyclo[2.2.2]octane
hydrochloride,
2-(2-methylcyclooctyl)-2-azabicyclo[2.2.2]octane
hydrochloride, and
2-(4,6-dimethylcyclooctyl)-2-azabicyclo[2.2.2]octane
hydrochloride, respectively.

EXAMPLE 7

Following the procedure of Example 3, Part A, but substituting cycloheptanone, cyclooctanone, 3 - methylcyclopentanone, 3,4-dimethylcyclopetanone, 2,5-dimethylcyclopentanone, 2,4-dimethylcyclohexanone, 2-methylcyclohexanone, 3-methylcyclohexanone, 4-methylcyclohexanone, 2,7 - dimethylcycloheptanone, 3,3 - dimethylcycloheptanone, 2-methylcyclooctanone, and 4,6-dimethylcyclooctanone for cyclohexanone, there can be prepared:
3-(1-cyclohepten-1-yl)-3-azabicyclo[3.2.2]nonane,
3-(1-cycloocten-1-yl)-3-azabicyclo[3.2.2]nonane,
3-(3-methyl-1-cyclopenten-1-yl)-3-azabicyclo[3.2.2]-
nonane,
3-(3,4-dimethyl-1-cyclopenten-1-yl)-3-azabicyclo[3.2.2]-
nonane,
3-(2,5-dimethyl-1-cyclopenten-1-yl)-3-azabicyclo[3.2.2]-
nonane,
3-(2,4-dimethyl-1-cyclohexen-1-yl)-3-azabicyclo[3.2.2]-
nonane,
3-(2-methyl-1-cyclohexen-1-yl)-3-azabicyclo[3.2.2]-
nonane,
3-(3-methyl-1-cyclohexen-1-yl)-3-azabicyclo[3.2.2]-
nonane,
3-(4-methyl-1-cyclohexen-1-yl)-3-azabicyclo[3.2.2]-
nonane,
3-(2,7-dimethyl-1-cyclohexen-1-yl)-3-azabicyclo[3.2.2]-
nonane,
3-(3,3-dimethyl-1-cyclohepten-1-yl)-3-azabicyclo[3.2.2]-
nonane,
3-(2-methyl-1-cycloocten-1-yl)-3-azabicyclo[3.2.2]-
nonane, and
3-(4,6-dimethyl-1-cycloocten-1-yl)-3-azabicyclo[3.2.2]-
nonane, respectively.

EXAMPLE 8

Following the procedure of Example 3, Part B, but substituting 3-(1-cyclohepten - 1 - yl)-3-azabicyclo[3.2.2]-nonane, 3-(1-cycloocten-1-yl)-3-azabicyclo[3.2.2]nonane, 3-(3-methyl - 1 - cyclopenten-1-yl)-3-azabicyclo[3.2.2]-nonane, 3-(3,4-dimethyl - 1 - cyclopenten-1-yl)-3-azabicyclo[3.2.2]nonane, 3-(2,5-dimethyl - 1 - cyclopten-1-yl)-azabicyclo[3.2.2]nonane, 3-(2.4-dimethyl - 1 - cyclohexen - 1 - yl)-3-azabicyclo[3.2.2]nonane, 3-(2-methyl-1-cyclohexen - 1 - yl)-3-azabicyclo[3.2.2]nonane, 3-(3-methyl - 1 - cyclohexen-1-yl)-3-azabicyclo[3.2.2]nonane, 3-(4-methyl - 1 - cyclohexen-1-yl)-3-azabicyclo[3.2.2]nonane, 3-(2,7-dimethyl - 1 - cyclohepten-1-yl)-3-azabicyclo-[3.2.2]nonane, 3-(3,3-dimethyl-1-cyclohepten - 1 - yl)-3-azabicyclo[3.2.2]nonane, 3-(2-methyl - 1 - cycloocten-1-yl)-3-azabicyclo[3.2.2]nonane, and 3-(4,6-dimethyl-1-cycloocten - 1 - yl)-3-azabicyclo[3.2.2]nonane for 3-(1-cyclohexen - 1 - yl)-3-azabicyclo[3.2.2]nonane, there can be prepared: 3-cycloheptyl - 3 - azabicyclo[3.2.2]nonane, 3-cyclooctyl - 3 - azabicyclo[3.2.2]nonane, 3-(3-methylcyclopentyl) - 3 - azabicyclo[3.2.2]nonane, 3-(3,4-dimethylcyclopentyl) - 3 - azabicyclo[3.2.2]nonane, 3-(2,5-dimethylcyclopentyl)-3-azabicyclo[3.2.2]nonane, 3-(2,4-dimethylcyclohexyl) - 3 - azabicyclo[3.2.2]nonane, 3-(2-methylcyclohexyl) - 3 - azabicyclo[3.2.2]nonane, 3-(3-methylcyclohexyl) - 3 - azabicyclo[3.2.2]nonane, 3-(4-methylcyclohexyl-3-azabicyclo[3.2.2]nonane, 3-(2,7-dimethylcycloheptyl) - 3 - azabicyclo[3.2.2]nonane, 3-(3,3-dimethylcycloheptyl) - 3 - azabicyclo[3.2.2]nonane, 3-(2-methylcyclooctyl) - 3 - azabicyclo[3.2.2]nonane, and 3-(4,6-dimethylcyclooctyl) - 3 - azabicyclo[3.2.2]-nonane, respectively.

EXAMPLE 9

Following the procedure of Example 4, Part A, but substituting 3-bromocyclopentene and 3-iodocyclopentene for 3-chlorocyclopentene, the same compound, 3-(2-cyclopenten-1-yl)-3-azabicyclo[3.2.2]nonane, can be prepared.
Also following the procedure of Example 4, Part A, but substituting 3-bromocyclohexene, 3-chlorocycloheptene, 3-chlorocyclooctene, 3-chloro-5-methylcyclopentene, and 3-chloro-4,6-dimethylcyclohexene for 3-chlorocyclopentene, there can be prepared: 3-(2-cyclohexen-1-yl)-3-azabicyclo[3.2.2]nonane, 3-(2-cyclohepten-1-yl) - 3 - azabicyclo[3.2.2]nonane, 3-(2-cycloocten-1-yl)-3-azabicyclo-[3.2.2]nonane, 3-(5-methyl - 2 - cyclopenten-1-yl)-3-azabicyclo[3.2.2]nonane, and 3-(4,6-dimethyl-2-cyclohexen-1-yl)-3-azabicyclo[3.2.2]nonane, respectively.
Also following the procedure of Example 4, Part A, but substituting 2-azabicyclo[2.2.2]octane for 3-azabicyclo-[3.2.2]nonane, 2-(2-cyclopenten-1-yl) - 2 - azabicyclo-[2.2.2]octane can be prepared.

We claim:
1. N-cycloalkyl-azabicyclooctanes and -nonanes of the formula

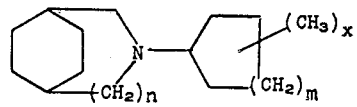

wherein $x$ is an integer from 0 to 2, inclusive; $n$ is an integer from 0 to 1, inclusive; and $m$ is an integer from 1 to 4, inclusive, and acid addition salts thereof.
2. 2-cycloalkyl-2-azabicyclo[2.2.2]octanes and acid addition salts according to claim 1 wherein $n$ is 0.
3. 2-cyclohexyl - 2 - azabicyclo[2.2.2]octane hydrochloride according to claim 2.
4. 3-cycloalkyl - 3 - azabicyclo[3.2.2]nonanes and acid addition salts according to claim 1 wherein $n$ is 1.
5. 3-cyclohexyl - 3 - azabicyclo[3.2.2]nonane according to claim 4.
6. 3-cyclohexyl - 3 - azabicyclo[3.2.2]nonane hydrochloride according to claim 4.
7. 3-cyclopentyl - 3 - azabicyclo[3.2.2]nonane according to claim 4.

8. 3-cyclopentyl - 3 - azabicyclo[3.2.2.]nonane hydrochloride according to claim 4.

9. A compound of the formula

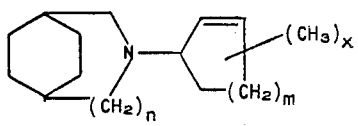

where *m* is an integer from 1 to 4, inclusive, and *x* is an integer from 0 to 1, inclusive, or acid addition salts thereof.

10. 3-(2-cyclopenten-1-yl) - 3 - azabicyclo[3.2.2]nonane according to claim 9.

11. 3-(2-cyclopenten-1-yl) - 3 - azabicyclo[3.2.2]nonane hydrochloride according to claim 10.

References Cited

UNITED STATES PATENTS 3,282,825 11/1966 Brown et al. _____ 260—239
3,314,922 4/1967 Berchtold _____ 260—239

OTHER REFERENCES

West: J. Chem. Ed., vol. 40, pp. 195–196 (1963).

ALTON D. ROLLINS, *Primary Examiner.*

UNITED STATES PATENT OFFICE
CERTIFICATE OF CORRECTION

Patent No. 3,385,846                                    May 28, 1968

Milton E. Herr et al.

It is certified that error appears in the above identified patent and that said Letters Patent are hereby corrected as shown below:

Column 2, line 40, "azobicyclooctane" should read -- azabicyclooctane --. Column 7, line 15, "wave" should read -- gave --; line 65, "yl-3" should read -- yl)-3 --. Column 8, line 36, "[2.2.2.]" should read -- [2.2.2] --; line 65, "2-(1-cyclohepten-1-yl)" should read -- 2-(1-cycloocten-1-yl) --. Column 9, before line 1, insert -- 2-(3-methyl-1-cyclohexen-1-yl)-2-azabicyclo[2.2.2]octane, --; line 45, "3,4-dimethyl-cyclopetanone" should read -- 3,4-dimethylcyclopentanone --; line 68, "cyclohexen" should read -- cyclohepten --. Column 10, line 7, "cyclopten" should read -- cyclopenten --; line 8, "3-(2.4-" should read -- 3-(2,4- --. Column 11, lines 5 to 9, the left-hand portion of the formula should appear as shown below:

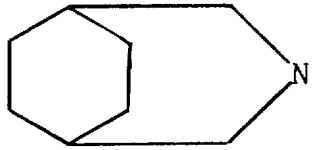

Column 12, line 4, "claim 10" should read -- claim 9 --; line 8, "3,282,825" should read -- 3,282,925 --.

Signed and sealed this 23rd day of December 1969.

(SEAL)
Attest:

EDWARD M. FLETCHER, JR.                        WILLIAM E. SCHUYLER, JR.
Attesting Officer                                   Commissioner of Patents